US00RE46910E

(19) United States
(12) Reissued Patent
Aylward et al.

(10) Patent Number: US RE46,910 E
(45) Date of Reissued Patent: Jun. 26, 2018

(54) PACKAGING APPARATUS FOR HANDLING PILLS AND ASSOCIATED METHOD

(71) Applicant: AYLWARD ENTERPRISES, LLC, New Bern, NC (US)

(72) Inventors: John T. Aylward, New Bern, NC (US); Dana Waterman, Charlotte, NC (US)

(73) Assignee: AYLWARD ENTERPRISES, LLC, New Bern, NC (US)

(21) Appl. No.: 14/694,962

(22) Filed: Apr. 23, 2015

Related U.S. Patent Documents

Reissue of:
(64) Patent No.: 8,424,274
Issued: Apr. 23, 2013
Appl. No.: 12/267,410
Filed: Nov. 7, 2008

(51) Int. Cl.
*B65B 1/04* (2006.01)
*B65B 65/08* (2006.01)
*B65B 37/08* (2006.01)
*B65B 35/26* (2006.01)
(Continued)

(52) U.S. Cl.
CPC ..... *B65B 65/08* (2013.01); *B65B 35/26* (2013.01); *B65B 37/08* (2013.01); *B65B 5/103* (2013.01)

(58) Field of Classification Search
CPC ..... B65B 35/26; B65B 35/10; B65B 35/46; B65B 35/54; B65B 35/00; B65B 37/08; B65B 37/12; B65B 37/16; B65B 37/00; B65B 65/08; B65B 5/103; B65B 5/10; B65B 5/00
See application file for complete search history.

(56) References Cited

U.S. PATENT DOCUMENTS 422,364 A 3/1890 Bateson
792,918 A 6/1905 Ohlendorf et al.
1,383,623 A 7/1921 Groves
(Continued)

FOREIGN PATENT DOCUMENTS

CA 2203856 10/1998
DE 20 2004 012 512 U1 8/2004
(Continued)

OTHER PUBLICATIONS

Translation of DE 202004012512 U1, 2017.*
(Continued)

*Primary Examiner* — Patricia Engle
(74) *Attorney, Agent, or Firm* — Alston & Bird LLP

(57) ABSTRACT

A packaging apparatus and method for depositing pills into a series of containers is provided. A cylindrical rotary slat is rotatable about a first axis and comprises radially inward and outward portions, the radially outward portion defining pill apertures for receiving pills therein at a first angular position. A negative pressure system is configured to apply a negative pressure to the pill apertures to retain the pills therein. An ejection device is in communication with the pill apertures at a second angular position of the rotary slat to eject the respective pills outwardly from the pill apertures. A collection mechanism is disposed adjacent to the radially outward portion about the second angular position, and is configured to collect the pills ejected from the pill apertures and to direct the pills toward the series of containers for deposition therein.

79 Claims, 7 Drawing Sheets

(51) Int. Cl.

| | |
|---|---|
| *B65B 67/10* | (2006.01) |
| *B65B 5/10* | (2006.01) |

(56) References Cited

U.S. PATENT DOCUMENTS

| | | | | | |
|---|---|---|---|---|---|
| 1,775,141 | A | | 9/1930 | Risser | |
| 1,824,432 | A | | 9/1931 | Hendry | |
| 1,839,327 | A | | 1/1932 | Mayo | |
| 2,094,460 | A | | 9/1937 | McBean et al. | |
| 2,479,667 | A | | 8/1949 | Boylan | |
| 2,585,558 | A | | 2/1952 | Lakso | |
| 2,742,184 | A | | 4/1956 | Yerkes et al. | |
| 2,845,759 | A | | 8/1958 | Cote et al. | |
| 3,028,713 | A | | 4/1962 | Kennedy et al. | |
| 3,139,713 | A | | 7/1964 | Merrill et al. | |
| 3,156,201 | A | * | 11/1964 | Tweedale | A01C 7/044 111/179 |
| 3,206,062 | A | | 9/1965 | Rappaport | |
| 3,225,513 | A | | 12/1965 | Ehe | |
| 3,354,607 | A | | 11/1967 | Lakso | |
| 3,387,695 | A | | 6/1968 | Hendrickson | |
| 3,412,908 | A | | 11/1968 | Ferrault | |
| 3,417,542 | A | | 12/1968 | Merrill et al. | |
| 3,677,437 | A | | 7/1972 | Haigler | |
| 3,722,740 | A | | 3/1973 | List | |
| 3,782,590 | A | | 1/1974 | Apfel | |
| 3,789,575 | A | * | 2/1974 | Bross | B65B 35/26 221/211 |
| 3,796,346 | A | | 3/1974 | Ribouleau | |
| 3,837,139 | A | | 9/1974 | Roseberg | |
| 3,925,960 | A | | 12/1975 | Saari et al. | |
| 3,979,878 | A | | 9/1976 | Berney | |
| 3,986,636 | A | | 10/1976 | Hoppmann et al. | |
| 4,017,003 | A | | 4/1977 | Heino | |
| 4,026,437 | A | * | 5/1977 | Biddle | A01C 7/044 111/179 |
| 4,029,235 | A | * | 6/1977 | Grataloup | A01C 7/046 221/211 |
| 4,047,637 | A | | 9/1977 | Grunstad et al. | |
| 4,094,129 | A | | 6/1978 | List | |
| 4,094,439 | A | | 6/1978 | List | |
| 4,154,681 | A | * | 5/1979 | Shields et al. | 210/167.26 |
| 4,231,462 | A | * | 11/1980 | Ackley et al. | 198/380 |
| 4,265,072 | A | | 5/1981 | Egli | |
| 4,308,942 | A | * | 1/1982 | Ackley | 198/380 |
| 4,308,945 | A | | 1/1982 | Ackley | |
| 4,449,642 | A | | 5/1984 | Dooley | |
| 4,672,892 | A | * | 6/1987 | Ackley | B41F 17/36 101/35 |
| 4,674,259 | A | | 6/1987 | Hills | |
| 4,677,283 | A | | 6/1987 | Lewis | |
| 4,697,721 | A | | 10/1987 | Johnson et al. | |
| 5,454,464 | A | * | 10/1995 | Yamamoto | B65G 47/848 198/384 |
| 5,463,839 | A | | 11/1995 | Stange et al. | |
| 5,515,668 | A | | 5/1996 | Hunt et al. | |
| 5,638,657 | A | | 6/1997 | Archer et al. | |
| 5,787,825 | A | | 8/1998 | Yaji et al. | |
| 5,802,804 | A | * | 9/1998 | Esposti | B65B 9/045 53/246 |
| 6,185,901 | B1 | | 2/2001 | Aylward | |
| 6,266,946 | B1 | | 7/2001 | Aylward | |
| 6,269,612 | B1 | | 8/2001 | Aylward | |
| 6,357,495 | B1 | * | 3/2002 | Baroncini | B65B 5/103 141/129 |
| 6,401,429 | B2 | | 6/2002 | Aylward | |
| 6,422,418 | B1 | | 7/2002 | Collins et al. | |
| 6,505,460 | B2 | * | 1/2003 | Aylward | 53/473 |
| 6,561,377 | B1 | | 5/2003 | Pearson et al. | |
| 6,564,729 | B1 | * | 5/2003 | Petzoldt | A01C 7/044 111/179 |
| 6,631,826 | B2 | | 10/2003 | Pollard et al. | |
| 6,681,550 | B1 | | 1/2004 | Aylward | |
| 6,799,413 | B2 | | 10/2004 | Aylward | |
| 7,255,247 | B2 | | 8/2007 | Aylward | |
| 7,299,606 | B2 | * | 11/2007 | Bonatti et al. | 53/473 |
| 9,010,258 | B1 | * | 4/2015 | Richard | A01C 7/044 111/179 |
| 9,516,804 | B1 | * | 12/2016 | Djeu | A01C 7/046 |
| 2001/0045081 | A1 | | 11/2001 | Aylward | |
| 2004/0128955 | A1 | | 7/2004 | Aylward | |
| 2004/0237468 | A1 | * | 12/2004 | Baroncini | B65B 1/08 53/251 |
| 2005/0217208 | A1 | * | 10/2005 | Cicognani | B65B 5/08 53/54 |
| 2006/0006190 | A1 | | 1/2006 | Janet et al. | |
| 2006/0180234 | A1 | | 8/2006 | Aylward | |
| 2006/0201781 | A1 | | 9/2006 | Kodera | |
| 2007/0289660 | A1 | | 12/2007 | Aylward | |
| 2009/0044495 | A1 | | 2/2009 | Aylward | |
| 2009/0094947 | A1 | | 4/2009 | Aylward | |
| 2013/0081924 | A1 | * | 4/2013 | Baroncini | B65B 5/103 198/562 |

FOREIGN PATENT DOCUMENTS

| | | |
|---|---|---|
| WO | WO 94/05859 | 7/1994 |
| WO | WO 94/15859 | 7/1994 |
| WO | WO 03/097459 A | 11/2003 |

OTHER PUBLICATIONS

Office Action from related U.S. Appl. No. 12/188,625, dated Nov. 9, 2010.

Office Action dated Jul. 12, 2010, and issues in connection with corresponding U.S. Appl. No. 12/188,535.

Conta Tablet Counter Series Brochure available at http://imanova.com/products/Tablet_Filling_Electronic/literature/Conta.pdf; 2 sheets; 2004.

"Suppliers' Forum," *Food & Drug Packaging,* available at http://www.fdp.com/content.php?s=FP/2005/10&p=15; 6 sheets; 2006.

"Electronic Tablet Counters," *Packaging World Magazine* available at http://www.packworld.com/cds_search.html?rec_id=19964&ppr_key=tablet%20counters&sky_key=tablet%20counters&term=tablet%20counters; 2 sheets; 2004.

Tablet Filling—Conta available at http://www.imanova.com/conta/html; 1 sheet; Sep. 7, 2006.

* cited by examiner

PACKAGING APPARATUS FOR HANDLING PILLS AND ASSOCIATED METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

Embodiments of the present invention relate to packaging machines and, more particularly, to an automated packaging machine for filling containers with pills, and associated method.

2. Description of Related Art

Pharmaceutical medicines and associated packaging apparatus are typically subject to relatively strict consumer protection guidelines. For example, pills, capsules, and the like, must be produced and packaged in such a way as to at least meet the minimum sterility requirements mandated by federal regulations. In addition, the pills should be delivered into the packaging such that the contents accurately meet the claimed labeling "count", i.e., each package includes exactly the predetermined number of pills. Notwithstanding the above, it is also desired to package the product in a mass production operation to offset costs typically attributed to a labor intensive operation in order to provide an economic product.

In the past, pill filling machines have been proposed that provide automated bottle counts by filling a hopper with pills and causing a plurality of the pills to be caught by a pill capturing device, such as an array of rotary slats. The rotary slats drop the captured pills into a plurality of bottles disposed in alignment with the dropping pills. The bottles are distributed along an endless conveyor belt that is timed to advance and stop the bottles according to the filling operation.

Conventional pill capturing devices more particularly include a series of rotary slats each configured to receive, hold, and move a plurality of capsules or pills along a closed path. The rotary slats are typically discs fixed on a rotatable shaft and have a plurality of openings in the outer peripheral edge portion thereof for capturing individual pills. Accordingly, the closed path is arcuate and generally disposed between a pill hopper and discharge area above the conveyor belt. By the rotary action of the slat, the pills move in a direction normal to the conveyor belt. The pill capturing device then generally discharges the pills by rotating the slats, which move corresponding to the closed path, such that the pills fall out of the respective openings at the filling station. The pills are often funneled through a chute that empties into a corresponding bottle.

The "count," or number of pills in the bottle, is determined by positioning the bottles in the pill dropping zone for a predetermined time. The duration of the filling operation for each bottle corresponds to the number of openings in each slat that the machine is capable of delivering to the bottles per unit of time. The duration of the filling operation, speed of the rotary slats, and configuration of the pill capturing device are used to calculate the count.

Unfortunately, if the pill capturing device fails to capture a pill in each and every cavity or receptacle, or if a pill should mistakenly be diverted, at least one of the bottles can be improperly filled. The conventional solution to this problem is to situate an operator adjacent to the slats to ensure that each receptacle is filled with a pill. If a pill is missing, the operator manually places a pill in the receptacle. Such an approach involves labor costs and can be unsatisfactory for sterility purposes. In addition, the accuracy of the count of each bottle is largely determined by the operator and, as such, a fully and consistently accurate count cannot be guaranteed.

U.S. Pat. No. 6,185,901 to Aylward, which is incorporated herein by reference, provides an exemplary solution to this problem by way of a machine with independently driven rotary slats. The pills are allowed to fall into an exterior receptacle of a rotary slat and, in one embodiment, passed under a rotary brush in an attempt to prevent two pills from being disposed in the same receptacle. A separate counting device is associated with each rotary slat for counting each pill as it falls from the slat into the container. A positive count is provided for each container and improperly filled slats will not affect the total count for that container. If a particular container has a low count, the respective slat can be further rotated to fill the container. Because the slats are independently driven, the other slats can remain stationary to prevent overfilling. Thus, the machine permits an accurate filling of each bottle.

One alternative apparatus is a rotatable drum, as provided in U.S. Pat. No. 4,094,439 to List. The rotatable drum includes a plurality of parallel rows of throughgoing holes that constitute receptacles for dragees. The dragees enter the receptacles in the drum from the interior of the drum at an inner input location, exit to the exterior of the drum at an outer retrieval location, and are filled into bottles. An ordering device facilitates the entry of the dragees into the receptacles, and feeler blades engage the receptacles. If any of the receptacles in an axially extending row do not contain a dragee, one of the feeler blades actuates a bolt pusher, which prevents any of the dragees in the row from being filled into the bottles. Instead, a solenoid and knockout bar empty the receptacles of the row. By preventing the bottles to be filled from partially filled rows of receptacles, the apparatus prevents the different bottles from being filled at different rates.

Undesirably, the additional mechanical components that are required for emptying the partially filled rows of apertures increase the complexity, cost, and likelihood of failure of the apparatus. Additionally, emptying the partially filled rows slows the process of filling the bottles because no pills are dispensed from those rows.

Accordingly, there is a great need for a packaging apparatus which provides an accurate count for each container and operates at a high speed. The apparatus should require a minimum of operator intervention. Additionally, the apparatus should be cost effective, both in initial cost and maintenance costs.

BRIEF SUMMARY OF THE INVENTION

The above and other needs are met by aspects of the present invention which, according to one aspect, provides an automated packaging apparatus for depositing a predetermined amount of pills into each of a series of containers. Such an apparatus comprises at least one rotary slat, wherein each rotary slat is configured as a cylinder independently rotatable in a rotational direction about a first axis extending longitudinally therethrough and comprises a radially inward portion and a radially outward portion. The radially outward portion defines a plurality of pill apertures therein, wherein each pill aperture is adapted to receive a pill from a plurality of pills disposed adjacent to the radially outward portion of the respective cylinder. The pills are received by the pill apertures at a first angular position of the at least one rotary slat. A negative pressure system is operably engaged with the radially inward portion of the at least one rotary slat and is configured to be in fluid communication with the pill apertures thereof. The negative pressure system is configured to apply a negative pressure to the pill apertures so as to retain the pills therein, as the at least one rotary slat rotates about the first axis. An ejection device is operably engaged with the radially inward portion of the at least one rotary slat and is configured to be in communication with the pill apertures thereof at a second angular position. The second angular position is angularly spaced apart from the first angular position in the rotational direction, so as to eject the respective pills from the pill apertures outwardly of the radially outward portion. A collection mechanism is disposed adjacent to the radially outward portion of the at least one rotary slat about the second angular position, wherein the collection mechanism is configured to collect the pills ejected from the pill apertures of the at least one rotary slat and to direct the pills toward the series of containers for deposition therein.

Another aspect provides an automated packaging apparatus for depositing a predetermined amount of pills into each of a series of containers. Such an apparatus comprises a rotary drum configured as a cylinder rotatable in a rotational direction about a first axis extending longitudinally therethrough and comprising a radially inward portion and a radially outward portion. The radially outward portion defines a plurality of pill apertures therein, wherein each pill aperture is adapted to receive a pill from a plurality of pills disposed adjacent to the radially outward portion of the rotary drum, and wherein the pills are received by the pill apertures at a first angular position of the rotary drum. A negative pressure system is operably engaged with the radially inward portion of the rotary drum and is configured to be in fluid communication with the pill apertures thereof. The negative pressure system is configured to apply a negative pressure to the pill apertures so as to retain the pills therein, as the rotary drum rotates about the first axis. An ejection device is operably engaged with the radially inward portion of the rotary drum and is configured to be in communication with the pill apertures thereof at a second angular position. The second angular position is angularly spaced apart from the first angular position in the rotational direction, so as to eject the respective pills from the pill apertures outwardly of the radially outward portion. A collection mechanism is disposed adjacent to the radially outward portion of the rotary drum about the second angular position, wherein the collection mechanism is configured to collect the pills ejected from the pill apertures of the rotary drum and to direct the pills toward the series of containers for deposition therein.

Yet another aspect comprises a method for depositing a predetermined amount of pills into each of a series of containers. Such a method comprises receiving a pill in each of a plurality of pill apertures defined by a radially outward portion of at least one rotary slat, about a first angular position thereof, wherein each rotary slat is configured as a cylinder independently rotatable in a rotational direction about a first axis extending longitudinally therethrough, from a plurality of pills disposed adjacent to the radially outward portion of the respective cylinder. A negative pressure is applied to the plurality of pill apertures with a negative pressure system operably engaged with the radially inward portion of the at least one rotary slat and configured to be in fluid communication with the pill apertures, so as to retain the pills within the pill apertures, as the at least one rotary slat rotates about the first axis. The pills are ejected from the pill apertures at a second angular position of the at least one rotary slat, wherein the second angular position is angularly spaced apart from the first angular position in the rotational direction, and the pills ejected outwardly of the radially outward portion, with an ejection mechanism operably engaged with the radially inward portion of the at least one rotary slat and configured to be in communication with the pill apertures at the second angular position. The pills ejected from the pill apertures of the at least one rotary slat are collected, and directed toward the series of containers for deposition therein, with a collection mechanism disposed adjacent to the radially outward portion of the at least one rotary slat about the second angular position.

A further aspect comprises a method for depositing a predetermined amount of pills into each of a series of containers. Such a method comprises receiving a pill in each of a plurality of pill apertures defined by a radially outward portion of a rotary drum, about a first angular position thereof, wherein the rotary drum is configured as a cylinder rotatable in a rotational direction about a first axis extending longitudinally therethrough, from a plurality of pills disposed adjacent to the radially outward portion of the rotary drum. A negative pressure is applied to the plurality of pill apertures with a negative pressure system operably engaged with the radially inward portion of the rotary drum and configured to be in fluid communication with the pill apertures, so as to retain the pills within the pill apertures, as the rotary drum rotates about the first axis. The pills are ejected from the pill apertures at a second angular position of the rotary drum, wherein the second angular position is angularly spaced apart from the first angular position in the rotational direction, outwardly of the radially outward portion, with an ejection mechanism operably engaged with the radially inward portion of the rotary drum and configured to be in communication with the pill apertures at the second angular position. The pills ejected from the pill apertures of the rotary drum are collected, and directed toward the series of containers for deposition therein, with a collection mechanism disposed adjacent to the radially outward portion of the rotary drum about the second angular position.

Thus, embodiments of the present invention include a packaging apparatus and associated method providing an accurate count of pills dispensed to each container. Such an apparatus requires a minimum of operator intervention, and can operate at a high speed. Additionally, such an apparatus is cost effective, both in initial cost and maintenance cost.

BRIEF DESCRIPTION OF THE SEVERAL VIEWS OF THE DRAWINGS

Figure 1:
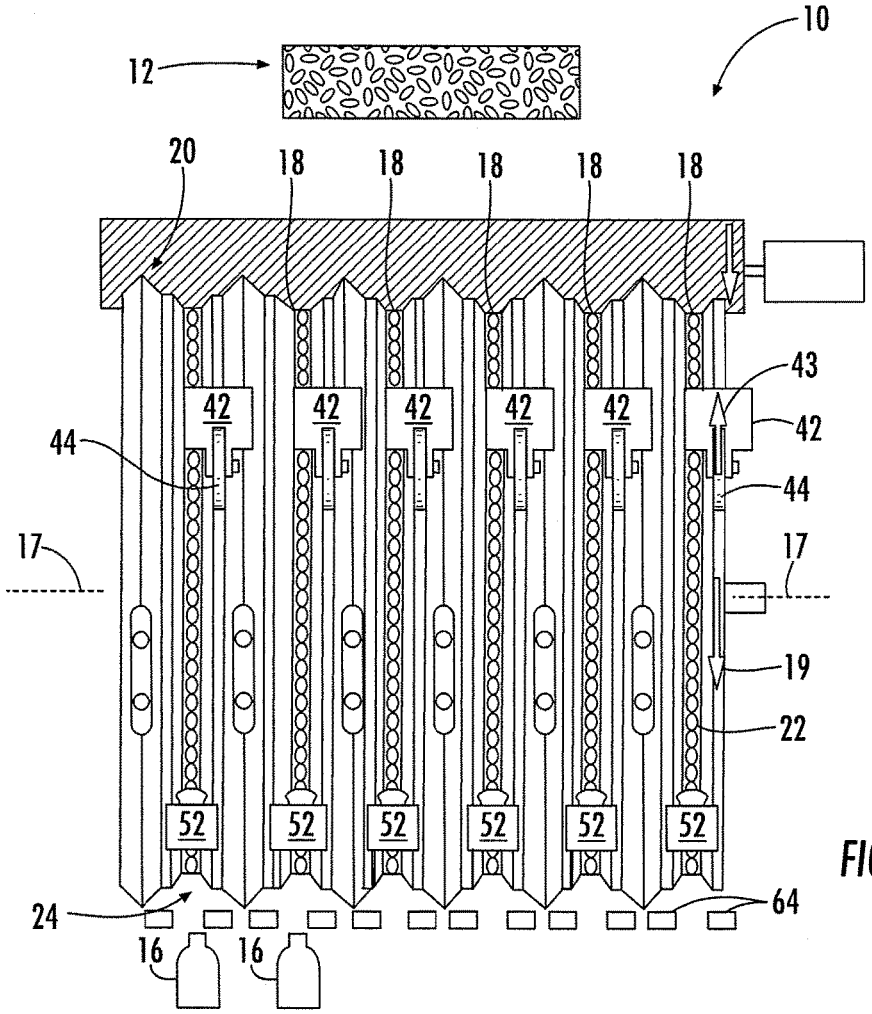
Figure 2:
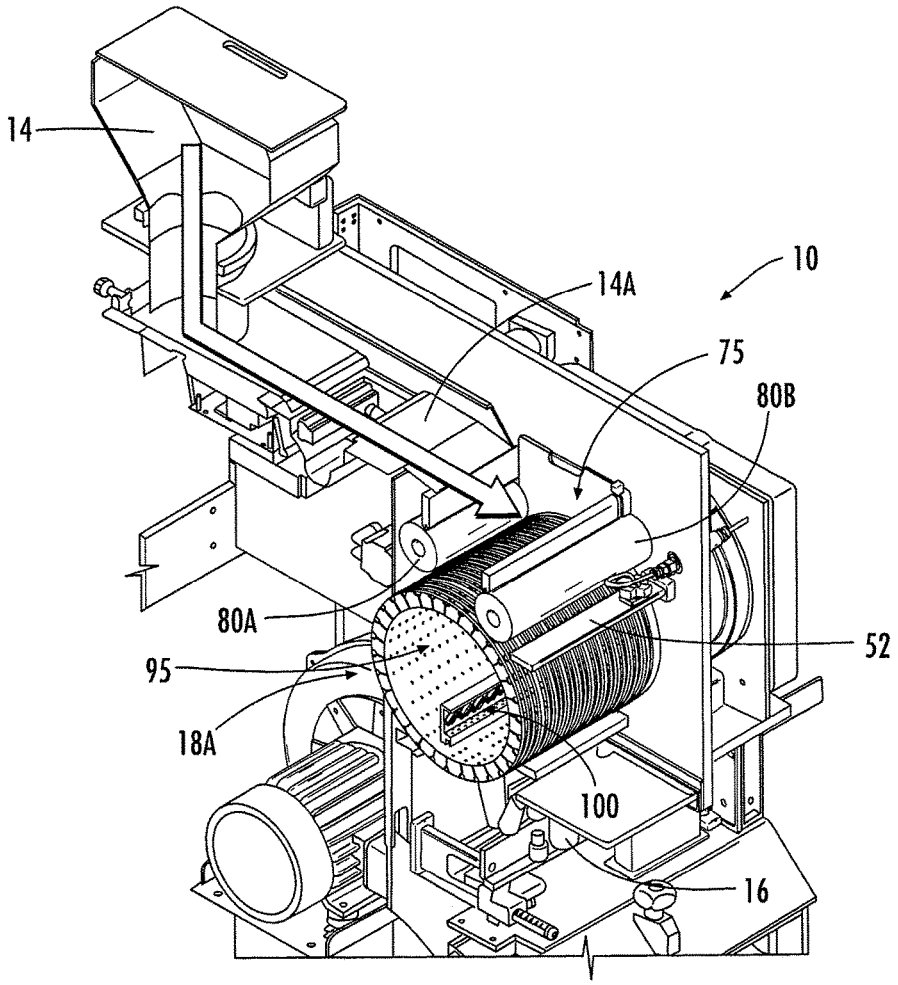
Figure 3:
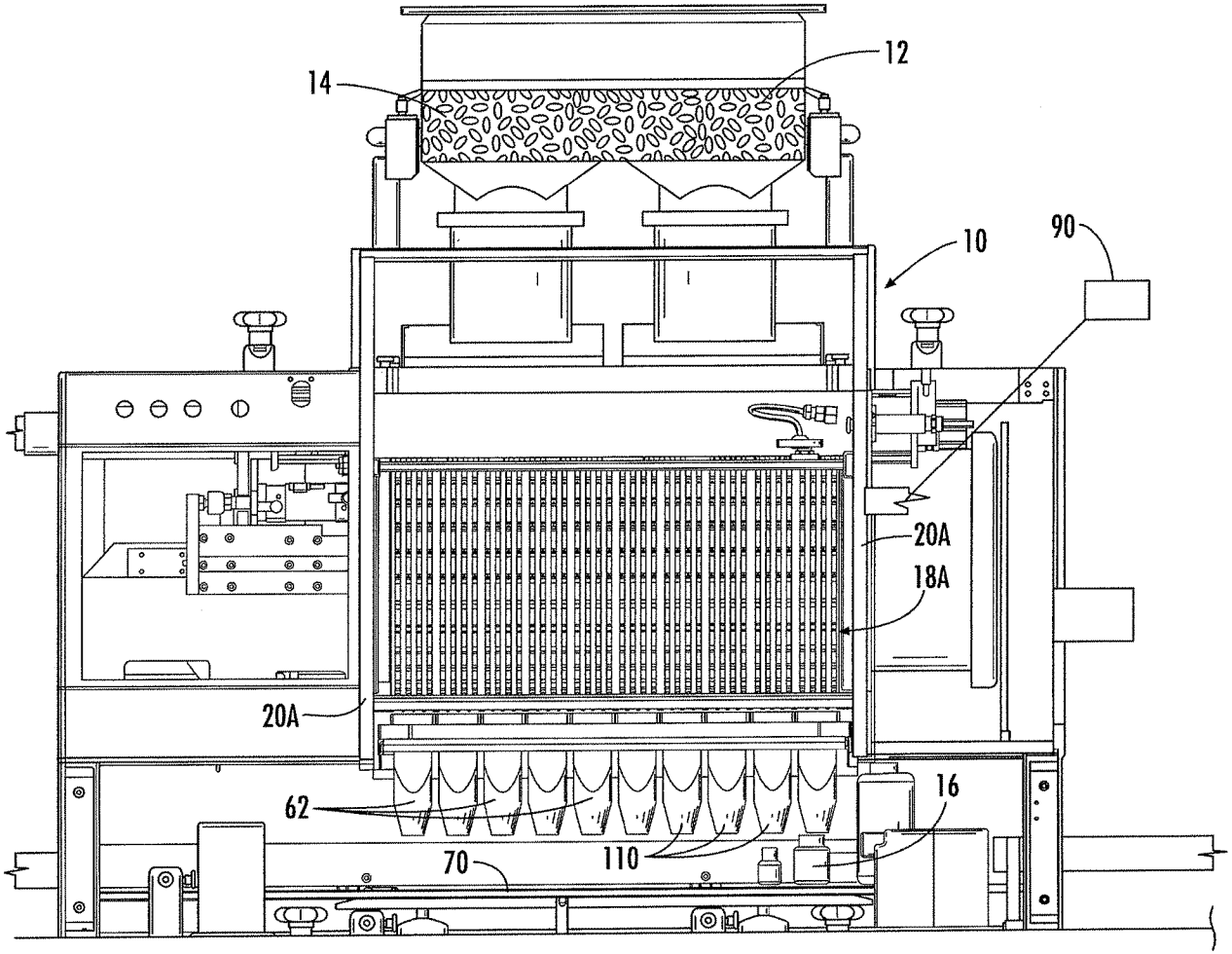
Figure 4:
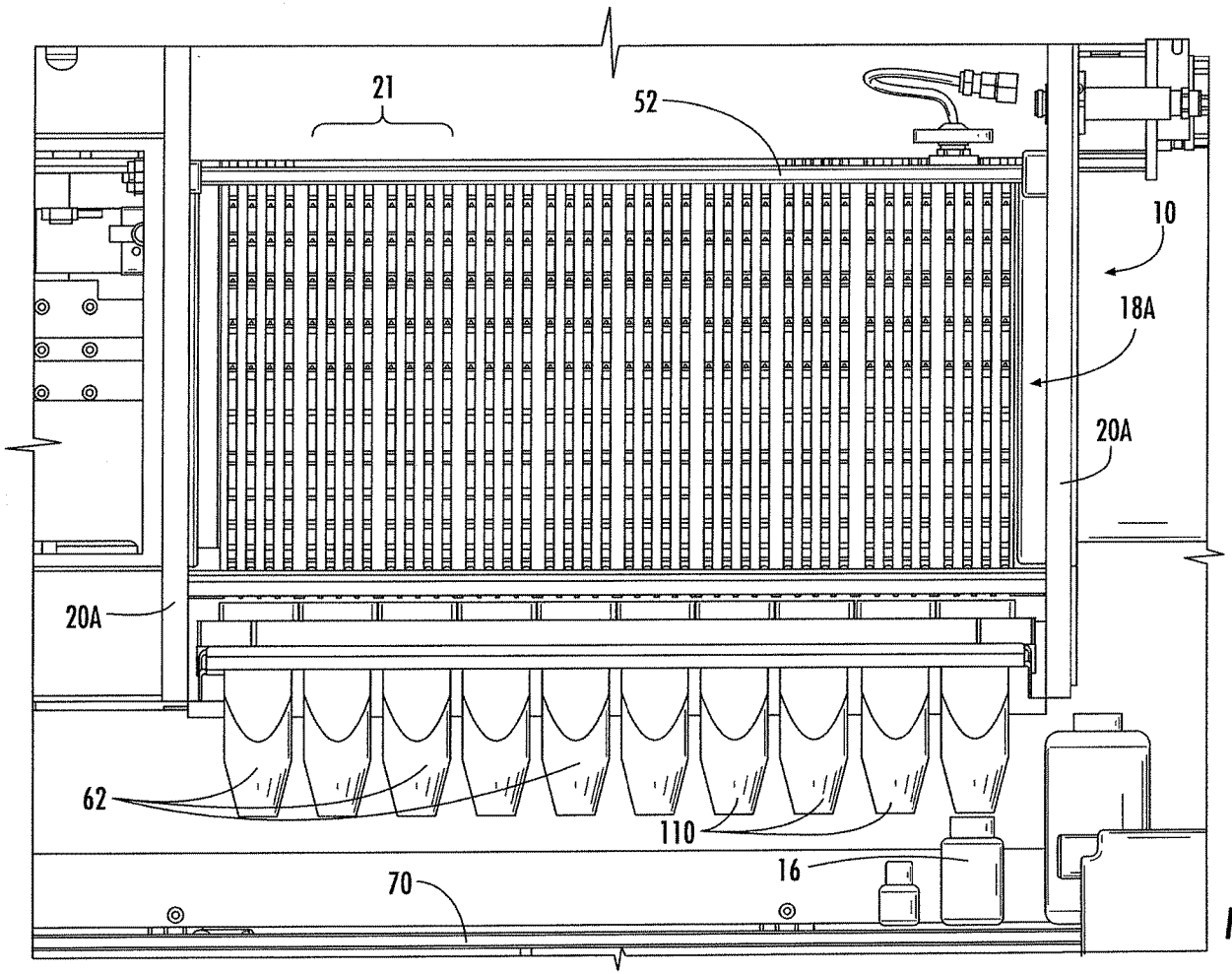
Figure 5:
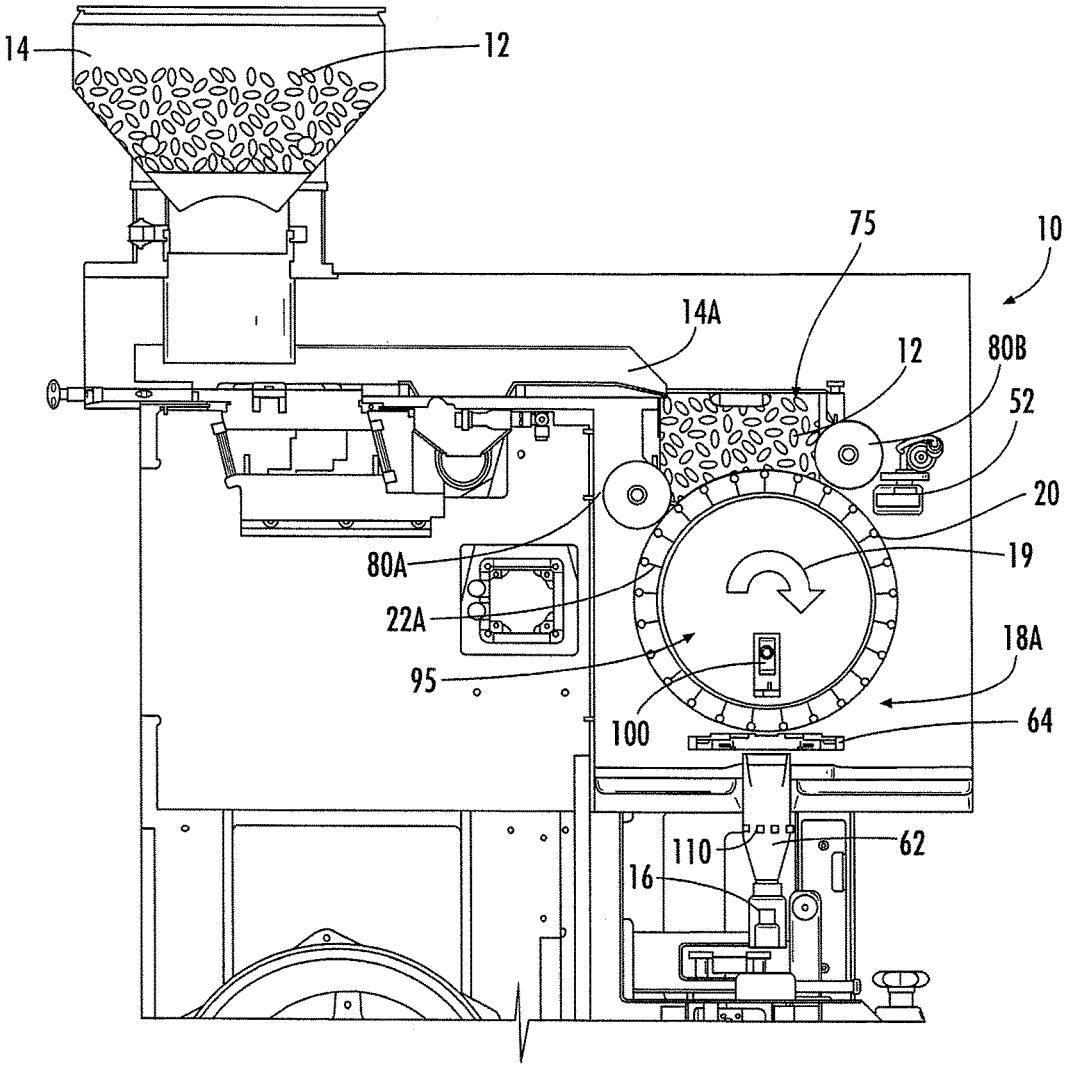
Figure 6:
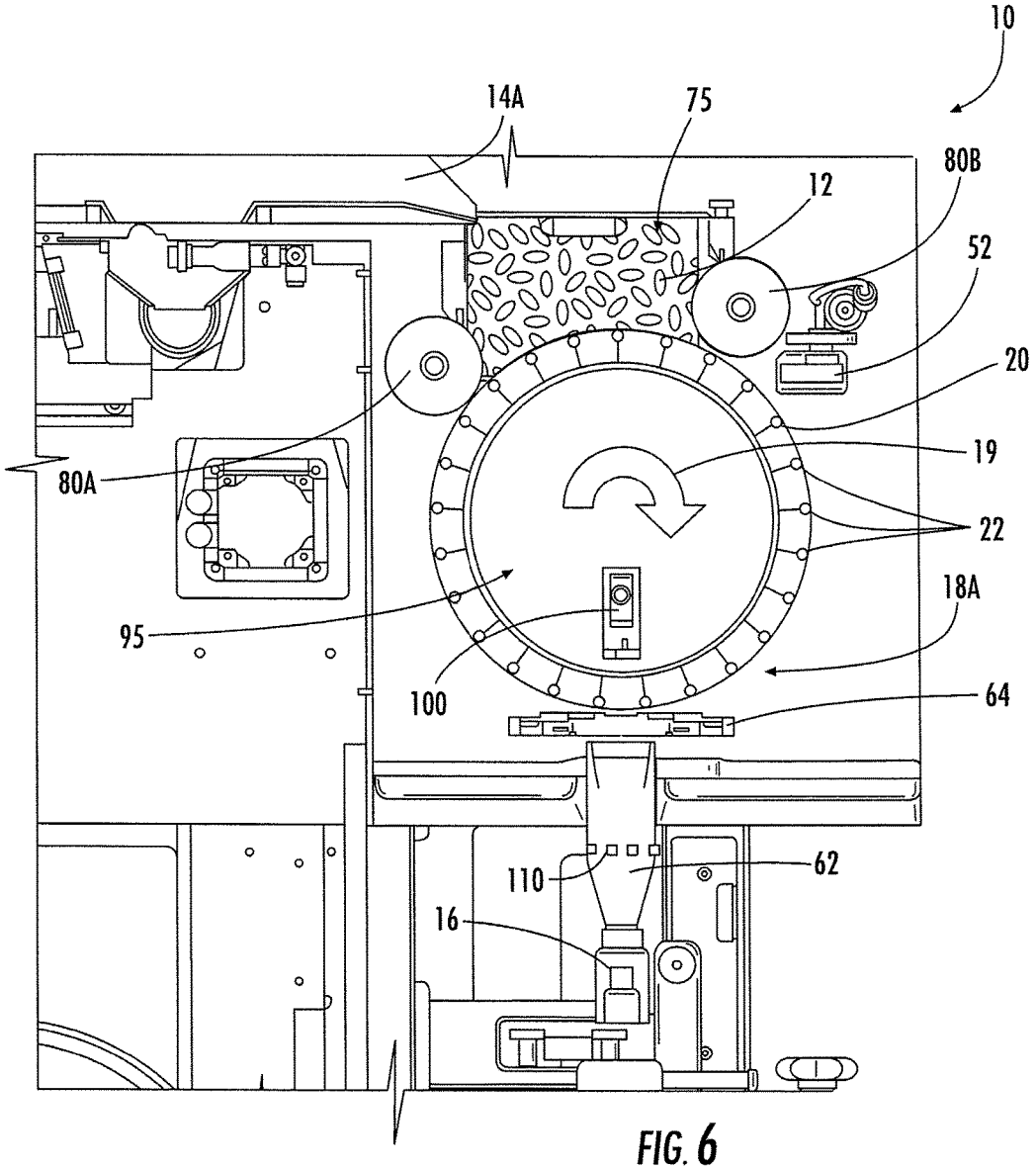
Figure 7:
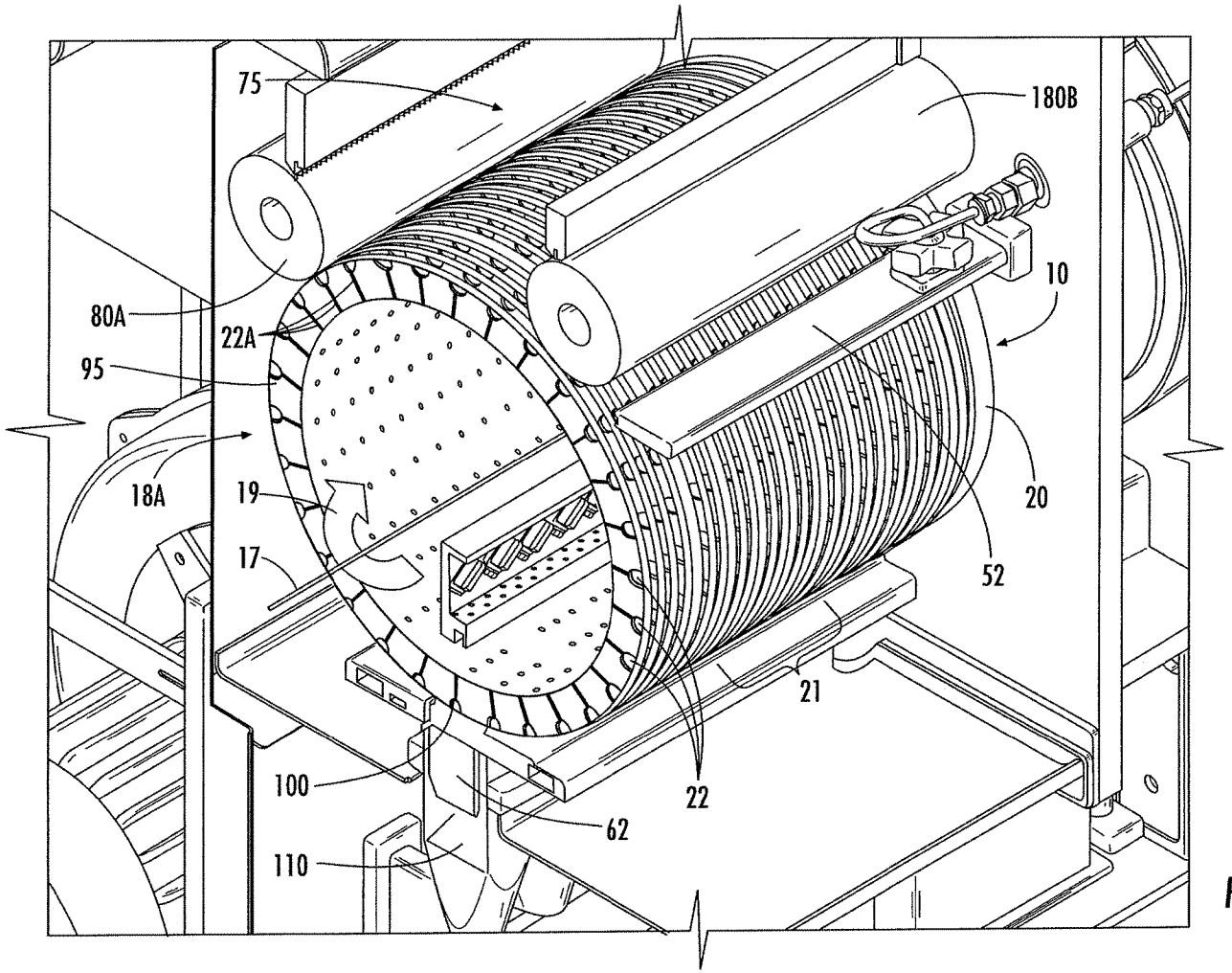

Having thus described the invention in general terms, reference will now be made to the accompanying drawings, which are not necessarily drawn to scale, wherein:

FIG. 1 schematically illustrates a pill handling apparatus according to one embodiment of the present invention, including a plurality of rotary slats;

FIG. 2 is a schematic cross-sectional perspective view of a pill handling apparatus according to an alternate embodiment of the present invention, implementing a single rotary drum;

FIGS. 3 and 4 are schematic elevations of the pill handling apparatus of FIG. 2;

FIGS. 5 and 6 are schematic cross-sectional side views of the pill handling apparatus of FIG. 2; and FIG. 7 is a schematic cross-sectional perspective view of the pill handling apparatus of FIG. 2.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is generally directed to a pill handling apparatus 10, such as an automated packaging machine. Such a pill handling apparatus can be used for dispensing pills into containers, as discussed, for example, in U.S. Pat. No. 6,185,901 to Aylward, and in U.S. Pat. No. 6,401,429 to Aylward, the contents of which are incorporated herein by reference. In other embodiments, such a pill handling apparatus can be used for other handling operations, besides pill packaging, such as transporting pills during manufacture, inspection, or the like. As illustrated in FIG. 1, the pill handling apparatus 10 is adapted for delivering pills 12 from a hopper/reservoir 14 into containers 16. As used herein, the term "pill" is not intended to be limiting and includes any discrete articles of the type used in the pharmaceutical industry or otherwise including, but not limited to, capsules, caplets, gelcaps, dragees, and tablets. Similarly, the receiving containers 16, although illustrated as bottles throughout, are not limited thereto and can be any of various configurations which provide an opening for receiving discrete articles therein, such as pouches or boxes.

As shown in FIG. 1, aspects of the pill handling apparatus 10 include one or more independently rotatable rotary slats 18 for transporting pills. Each rotary slat 18 has a radially outer portion or surface 20 defining pill apertures or receptacles 22 arranged along one or more rows or paths extending about the rotary slat, and is configured to be rotatable about a longitudinal axis extending therethrough. For example, the slats 18 are illustrated to have a single circumferential path of apertures 22. In instances of multiple rows/paths, the rows/paths may be spaced apart along the rotary slat (i.e., in the axial direction along the rotary slat). Each radially outer portion 20 may, in some instances, further define a contour 24 defining a slope extending toward one or more of the apertures to facilitate the entry of pills into those apertures. In particular, the radially outer portion 20 of each rotary slat 18 may also define a contiguous groove or slot that extends circumferentially around the slat 18, with the apertures 22 being defined within the groove. In such instances, the groove may define a further contour, or comprise the contour 24, for receiving the pills 12 and guiding the pills 12 into the apertures 22. While the apertures 22 are illustrated to be pocket-like apertures that extend inwardly from the radially outer portion 20 of the slat 18, the apertures can have other configurations. For example, the apertures can be holes, grooves, or flat portions defined by the exterior portion of the slat 18, or the like. Thus, the apertures 22 can define positions on the outer surface of the slat 18 where the pills 12 are received, i.e., positioned, and held during transport of the pills to the containers 16. The apertures need not define a contour that corresponds to the shape of the pills, and the apertures can be provided with or without the groove(s). That is, the apertures can be defined on or by the outer surface of the slat, or on or by the surface of an inwardly-extending groove.

In one particular aspect, as shown in FIGS. 2-7, the pill handling apparatus 10 may include a single rotary slat configured, for instance, as a single rotary drum 18A defining the apertures 22. In such instances, the apertures 22 may be arranged in a plurality of rows 21 extending along the rotary drum 18A, with each row 21 extending circumferentially about the rotary drum 18A (i.e., a configuration which may be likened to securing a plurality of axially-adjacent rotary slats 18 together to form the rotary drum 18A—in this manner, for example, the cost and complexity of the pill handling apparatus 10 may be reduced by eliminating, for instance, servos and controls associated with a plurality of independently-rotatable rotary slats). The disclosure herein will thus be exemplarily presented with respect to such a single rotary drum 18A, though one skilled in the art will appreciate that the principles disclosed herein may be similarly applicable to a pill handling apparatus 10 comprised of a plurality of independently-rotatable rotary slats.

As shown in FIGS. 2, 3, 5, and 6, the pills 12 are fed from the reservoir 14 to and along a chute member 14A, toward the radially outward portion 20 of the rotary drum 18A. The pills 12 are directed to a containment area 75 about the radially outward portion 20 of the rotary drum 18A, wherein the containment area 75 may be defined or otherwise formed, for example, by opposing containment members 80A, 80B angularly spaced-apart about the radially outward portion 20. The containment members 80A, 80B may comprise, for example, rollers in contact with the radially outward portion 20 and rotatable about longitudinal axes defined thereby, with the rollers being of sufficient diameter to effectively provide opposing walls for receiving and holding the pills 12 therebetween. If necessary, the opposed lateral sides of the rotary drum 18A may have retaining plates 20A operably engaged therewith for cooperating with the containment members 80A, 80B to retain the pills 12 within the containment area 75 associated with the rotary drum 18A. The containment area 75 is thus configured to introduce the pills 12 to the radially outward portion 20 of the rotary drum 18A defining the plurality of apertures 22. The relative rotary motion of the rotary drum 18A, as well as the containment members 80A, 80B may, in some instances, agitate the pills 12 in the containment area 75 so as to facilitate insertion of the pills 12 into the apertures 22 defined by the rotary drum 18A. In other instances, the downstream containment member 80B may serve as a "brush" for facilitating insertion of the pills 12 into the apertures 22 by brushing or rolling over the radially outward surface 20 after the pills 12 are directed into the apertures 22 in the containment area 75. The pills 12 are therefore introduced into and received by the apertures 22 within the containment area 75 about a first angular position of the rotary drum 18A, as the rotary drum 18A rotates about the longitudinal axis 17 thereof in a rotational direction 19.

In some instances, a controller or controller device (not shown) may also be in communication with a level sensor (not shown) within the containment area 75, and a reservoir gate switch (not shown) controlling a reservoir gate (not shown) disposed between the reservoir 14 and the containment area 75 (i.e., along the chute 14a). The level sensor may be configured to detect the quantity of pills 12 in the containment area 75 and to communicate a corresponding value or signal to the controller so as to appropriately control the feed of the pills from the reservoir 14 via the reservoir gate/reservoir gate switch. For example, the level sensor can detect the level of pills 12 in the containment area 75 associated with the rotary drum 18A and, when the controller detects that the level of pills 12 is below the desired level, the controller signals the reservoir gate switch to open the reservoir gate to release more pills from the reservoir 14 toward the containment area 75. By opening and closing the reservoir gate, the controller maintains a desired number of pills 12 within the containment area 75. The desired level of pills 12 may thus be adjusted, for example, to optimize the seating of pills 12 in the pill apertures 22 and/or to prevent loss, wear or breaking of the pills 12 caused by overfilling of the containment area 75.

As shown in FIG. 1, in configurations involving multiple slats 18, each slat 18 may be independently rotated by a respective drive motor 42 and drive wheel 44 to transport pills independently of the other slats 18. Each rotary slat 18 rotates in a first direction 19 defining an arcuate delivery path in the rotational direction 19, between the containment area 75 about the first angular position, and a second angular position, angularly spaced apart from the first angular position, where the pills 12 are released. In some instances, for example, the first angular position may be about a "twelve o'clock" position, and the second angular position may be about a "six o'clock" position, with the slat 18 rotating in a clockwise direction. In such a drive arrangement for the slats 18, the drive wheels 44 may be turned by the motors 42 in a second direction 43, rotationally opposite the first direction 19. The drive wheels engage the outer surfaces 20 by friction or geared engagement and turn the rotary slats in the first direction 19. In a similar manner, the single rotary drum 18A, as shown in FIGS. 2-7, may be engaged with and rotated by a drive arrangement or mechanism (not shown) to transport the pills 12 in the apertures 22 from the containment area 75 in the first direction 19, an arcuate delivery path, to the second angular position, where the pill 12 is released. In one instance, the second angular position is about 180 degrees away from the first angular position about the containment area 75, with the first angular position being, for instance, about the "twelve o'clock" position, and the second angular position being, for instance, about the "six o'clock" position. The drive arrangement may be configured, for example, to engage the radially outward portion 20 of the rotary drum 18A by friction or geared engagement to turn the rotary drum 18A in the first direction 19.

In some embodiments, a negative pressure or vacuum assembly 90 (see, e.g., FIG. 3) may be operably engaged with and in fluid communication with the interior portion 95 of the rotary drum 18A to apply suction thereto. In this regard, the apertures 22 defined by the rotary drum 18A may be in fluid communication with the interior portion 95 of the rotary drum 18A through, for example, one or more channels 22A extending therebetween. As such, since the suction may be applied generally to the interior portion 95 of the rotary drum 18A, air may be simultaneously drawn into all (or at least a portion) of the apertures 22 defined by the rotary drum 18A through the respective channels 22A. The suction imparted to the apertures 22 by the negative pressure assembly 90 via the interior portion 95 of the rotary drum 18A and via the channels 22A may thus, for instance, facilitate the reception of the pills 12 in the apertures 22 about the first angular position (containment area 75), and act upon the pills 12 received by the apertures 22 to retain pills 12 therein as the rotary drum 18A rotates at least from the first angular position (containment area 75) to the second angular position in the rotational direction 19. One skilled in the art will appreciate that the negative pressure assembly 90 may be configured in many different manners to provide the negative pressure acting upon the apertures 22. For example, the suction may be created using a fan, pump, or other appropriate low pressure source cooperating with the interior portion 95 of the rotary drum 18A, through a vacuum port engaged therebetween. As such, in some instances, all apertures 22 may be simultaneously exposed to or otherwise in simultaneous fluid communication with the suction applied to the interior portion 95 of the rotary drum 18A via the negative pressure assembly 90 such that air is drawn into the apertures 22 and through the air passages or channels 22A into the interior portion 95, via the vacuum port, when acted upon by the negative pressure assembly 90.

Thus, pills 12 deposited into the containment area 75 are urged toward receipt and capture by the apertures 22 because of the air currents and pressure differentials present at the apertures 22 due to the suction imparted by the vacuum assembly 90 via the interior portion 95. In some cases, the pills, once seated in the receptacles, partially or entirely block the air passages 22A. Thus, these descriptions relate to configurations wherein each seated pill completely seals the receiving receptacle to prevent further air flow, configurations wherein each seated pill partially seals the receiving receptacle to limit further air flow, and configurations wherein air flow is permitted without significant reduction by a pill seated in a receptacle.

As the rotary drum 18A rotates in the rotational direction, one or more of the pill-containing apertures 22 arrives at the release or second angular position. However, the pills 12 remain retained in the apertures 22 due to the suction imparted thereto by the negative pressure system 90. As such, aspects of the present invention further comprise an ejection device/mechanism 100 configured to eject the pills 12 from the apertures 22 disposed at the second angular position. In one instance, the ejection mechanism 100 may comprise, for example, an air emission device operably engaged with the interior portion 95 of the rotary drum 18A at the second angular position (i.e., at the "six o'clock" position). The air emission device 100 may be configured to be capable of communicating with the apertures 22 at the second angular position via the respective channels 22A, wherein the air emitted thereby may be positively pressurized so as to at least negate the suction provided by the negative pressure system 90. In this manner, upon actuation of the air emission device 100, the suction is at least negated with respect to the selected aperture 22, wherein the pill 12 may thus be non-contactingly ejected therefrom. However, in some instances, it may be desirable to effect a more positive ejection of the pill 12 from the aperture 22, for example, such that the ejected pill is not pulled back into the aperture 22 by the suction, or such that a positive pill dispensation can be achieved, so as to increase the overall pill packaging rate. As such, the air emission device 100 may be configured, in some instances, to provide the air at a positive pressure sufficient to overcome the effect of the suction imparted to the apertures 22 (i.e., the positive pressure of the air supplied by the air emission device 100 is greater in magnitude than the suction imparted to the apertures 22) whereby the pill 12 is positively ejected from the respective aperture 22 at the second angular position. Such a configuration may also provide a positive pill count pill packaging apparatus 10 wherein a pill 12 is not released (and indeed must be individually and affirmatively selected or otherwise independently targeted for release) from the aperture 22 of the rotary drum 18A, unless that pill count is needed. Even then, the positive ejection of the pill can be expediently and simply achieved by actuation of the air emission device 100 (as compared, for example, to the multiple rotary slat configuration in which individual slats must be rotated in order to achieve the desired pill count). Thus, overfill and/or undercount situations with respect to the number of pills 12 dispensed into each container 16 can be reduced, minimized, or otherwise eliminated.

The air emission device 100 may be configured, for example, as a parallel collection of supply tubes (not shown) corresponding to the number of rows 21 of apertures 22 defined by the rotary drum 18A, wherein each supply tube would extend into the interior portion 95 of the rotary drum 18A to a position in which the respective supply tube is capable of communicating with a channel 22A leading to a pill-containing aperture 22 at the second angular position. A collection of valves, corresponding to the number of supply tubes, may be disposed outside of the rotary drum 18A and in communication with the respective supply tube, wherein selective control of the collection of valves may accomplish the selective pill dispensation from the apertures 22, as disclosed herein. In other instances, the air emission device 100 may comprise, for instance, a single manifold device extending into the interior portion 95 of the rotary drum 18A. In such instances, the collection of valves may be engaged with the manifold device within the interior portion 95, with the manifold device otherwise being capable of communicating with the channels 22A leading to a pill-containing apertures 22 at the second angular position, via the collection of valves. Selective control of the collection of valves engaged with the manifold may thus also accomplish the selective pill dispensation from the apertures 22, as disclosed herein. In either instance, the collection of supply tubes or the manifold device may be configured to be in communication with a positive pressure source (not shown) for receiving positively pressurized air therefrom.

Further, since the ejection device 100 may be configured to provide a positive count and selective ejection of the pills 12 from the apertures 22, particular schemes for filling the respective containers 16 may be implemented. In one instance, the pill handling apparatus 10 may be further configured to include a collection mechanism 62 disposed about the radially outward portion 20 of the rotary drum 18A about the second angular position. Such a collection mechanism may comprise, for example, a chute member 62 extending between the rotary drum 18A at the second angular position, and a container 16 to be filled with pills 12. According to one aspect, a single container 16 may be provided with pills 12 through one or more chute members 62 collecting pills 12 from one or more rows 21 of apertures 22. That is, a chute member 62 may extend across and collect pills 12 from more than one row 21 of apertures 22. In some instances, such "grouped" rows 21 of apertures 22 may communicate with a single container 16 through a single chute member 62 and thereby possibly increase machine throughput (i.e., by increasing the fill rate). For example, each container 16 aligned adjacent to the radially outward portion 20 of the rotary drum 18A at the second angular position can be provided with pills 12 (whether simultaneously between the containers 16 or not) by a single chute member 62 extending across a plurality of rows 21 of apertures 22 (i.e., four rows). In such an instance, the ejection device 100 may be configured so as to be selectively actuatable for each of the four rows (i.e., individual valves extending from a manifold or affecting individual supply lines).

However, in other instances, the ejection device 100 may be configured so as to be selectively actuatable for three of the four rows, simultaneously, and the separately selectively actuatable for the fourth row of apertures 22. For example, three of the four rows of apertures 22 may share a single actuatable valve, whereby actuation of the valve ejects three pills 12 simultaneously from an aperture 22 in each of those three rows. The fourth and last row may have a separately actuatable valve associated therewith for selectively ejecting pills 12 from the apertures 22 in that fourth row. In this manner, a "coarse fill" function could be provided by simultaneously actuating both valves for ejecting pills 12 from all four rows into the chute member 62 and toward the container 16. Once the pill count approaches the desired number of pills 12 dispensed into the container 16, or if an undercount situation is detected, the actuation of the valve associated with the three rows can be discontinued, and the valve associated with the single row can continue to be selectively actuated so as to provided one pill at a time (i.e., a "fine fill" function), until the desired full count of pills 12 in the container 16 is attained (i.e., prevent "overfilling" of the container 16).

As illustrated in FIGS. 1-7, the pill handling apparatus 10 may further include one or more inspection devices 52 disposed adjacent to the radially outward portion 20 of the rotary drum 18A for inspecting, detecting, counting, or otherwise analyzing the pills 12 carried in the apertures 22. In some instances, each inspection device 52 can be an optical imaging device, such as a camera, that inspects the pills 12 by detecting an image of each pill to determine the size, shape, or other characteristics of the pill. Thus, the inspection devices 52 can be configured to determine the presence of the pills 12 in the apertures 22 and/or determine a characteristic of the pills 12, such as whether the pills 12 are broken or otherwise defective. If a pill is determined to be broken or defective, such a determination can be communicated to the ejection device 100 such that the particular broken/defective pill is not dispensed into a container 16. The inspection device(s) 52 can be disposed downstream of the reservoir 14 (i.e., following the downstream containment member 80B) for inspecting pills 12 in the apertures 22.

As further shown in FIGS. 1, 5, and 6, the number of pills 12 delivered to each container 16 can be determined and used to direct the operation of the ejection device 100. In this regard, one or more pill-counting devices 64 can be associated with each collection mechanism 62. Each pill-counting device 64 can be disposed between the rotary drum 18A and the respective container 16. For example, each pill-counting device 64 can be positioned adjacent, above, below, or within a respective chute member 62 so that any pill 12 which travels through the chute member 62 will be detected by the counting device 64. While the pill-counting devices 64 and inspection device(s) 52 are illustrated as different components, a combined detection device can alternatively be provided, in some instances, for performing the counting and/or inspecting of the pills 12. One exemplary pill-counting device 64 may include, for instance, a light source, and a light receiver positioned substantially opposite the light source, wherein the light source generates a light beam that is detected by the opposing light receiver. When the light beam is interrupted by a falling pill 12, the light receiver produces a signal which increases the ongoing pill count for a particular container 16. Thus, the number of interruptions of the pill-counting device 64 corresponds to the number of pills 12 which have been delivered into the container 16.

In order to position empty containers 16 for receiving the pills 12 from the rotary drum 18A, and moving the filled containers 16 away therefrom for further processing or packaging, the pill handling apparatus 10 may further include a conveyor system or conveying device 70 operably engaged therewith for handling the containers 16. For example, the containers 16 can be supported by a conveyor belt 70 (FIGS. 1-7) that is driven by a motor (not shown), in a direction parallel to the axis 17 about which the rotary drum 18A rotates. Stop gates (not shown) may be disposed proximate to the conveyor belt 70 and configured to be extended to block the path of the containers 16 on the conveyor belt 70, and to hold the containers 16 in positions corresponding to the collection mechanisms 62. A further stop gate can be extended to block the path of further unfilled containers 16, before such containers 16 are moved adjacent to the rotary drum 18A, until the preceding containers 16 are filled. Alternatively, a screw auger (not shown) can be used to transport the containers 16 and position the containers adjacent to the rotary drum 18A. The screw auger can maintain the containers 16 at consecutively spaced intervals, and as the screw auger is rotated, each of the containers 16 is transported toward or away from the rotary drum 18A. Rotation of the screw auger can be adjusted to control the speed and direction of the movement of the containers 16.

Many modifications and other embodiments of the invention will come to mind to one skilled in the art to which this invention pertains having the benefit of the teachings presented in the foregoing descriptions and the associated drawings. For example, one skilled in the art will appreciate that, while the illustrated vacuum assembly 90 is used to maintain the pills 12 in the apertures 22 between the first and second angular positions, a shroud or cover can be additionally provided about the radially outward portion 20 of the rotary drum 18A, extending at least between the first and second angular positions for preventing the release of the pills 12 from the apertures 22 therebetween.

In addition, for instance, the collection mechanism 62 may further comprise a selectively actuatable stop gate 110, in some embodiments, disposed within the chute member 62, following the chute member 62, or otherwise operably engaged with the chute member 62, after the pills 12 directed through the chute member 62 are counted by the pill-counting device(s) 64 and/or inspection device(s) 52 and before the pills 12 are deposited within the container 16. In this manner, when the desired pill count is reached for the container(s) 16 corresponding to the chute member 62, the stop gate 110 may be actuated to interrupt the delivery path to the container 16 and accumulate pills 12 dispensed from the rotary drum 18A and counted by the pill-counting device 64/inspection device 52, while the conveyor system/conveying device 70 moves another container 16 into registration with the chute member 62 for accepting pills 12. Once the next container 16 is in registration with the chute member 62, the stop gate 110 can then be de-actuated, to re-open the pill delivery path through the chute member 62 and to release the counted and accumulated pills 12 into the container 16. As such, the actuatable stop gate 110 associated with the chute member 62 for overlapping the pill counting and container indexing functions, may serve to increase the throughput of the pill handling apparatus 10 since the dispensing function of the rotary drum 18A/ejection device 100 may not have to be halted while the conveying device 70 moves a new container 16 or series of containers 16 into registration with the collection mechanism (s) 62. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for depositing a predetermined amount of pills into each of a series of containers, comprising:

receiving a pill in each of a plurality of pill apertures defined by a radially outward portion of at least one rotary slat, about a first angular position thereof, each rotary slat being configured as a cylinder independently rotatable in a rotational direction about a first axis extending longitudinally therethrough between at least the first angular position and a second angular position, the second angular position being angularly spaced apart from the first angular position in the rotational direction, each pill aperture configured to receive a pill from a plurality of pills disposed adjacent to the radially outward portion of the respective cylinder;

applying a negative pressure to each of the plurality of pill apertures with a negative pressure system operably engaged with the radially inward portion of the at least one rotary slat at least between the first angular position and the second angular position, *including the second angular positon,* and in fluid communication with each of the plurality of pill apertures located at least between the first angular position and the second angular position *and including the second angular position,* so as to retain the pills within the pill apertures as the at least one rotary slat rotates about the first axis between the first angular position and the second angular position;

ejecting the pills from the pill apertures at the second angular position of the at least one rotary slat, the pills being ejected outwardly of the radially outward portion with an ejection mechanism operably engaged with the radially inward portion of the at least one rotary slat and configured to be in communication with the pill apertures at the second angular position; and collecting the pills ejected from the pill apertures of the at least one rotary slat, and directing the pills toward the series of containers for deposition therein with a collection mechanism disposed adjacent to the radially outward portion of the at least one rotary slat about the second angular position.

2. A method according to claim 1 wherein ejecting the pills from the pill apertures further comprises ejecting the pills from the pill apertures with an ejection mechanism comprising an air emission device configured to emit positively pressurized air to the pill apertures of the at least one rotary slat disposed at the second angular position.

3. A method according to claim 2 wherein emitting positively pressurized air further comprises emitting positively pressurized air at a pressure capable of overcoming the negative pressure retaining the pills within the pill apertures, so as to eject the pills therefrom.

4. A method according to claim 1 wherein the first axis is substantially horizontally disposed, and the method further comprises moving at least one container into coincidence with the collection mechanism, with a conveyor device, such that the at least one container receives a selected amount of pills from the collection mechanism.

5. A method according to claim 1 wherein receiving a pill in each of a plurality of pill apertures defined by at least one rotary slat further comprises receiving a pill in each of a plurality of pill apertures defined in a plurality of rows along a radially outward portion of a single rotary drum.

6. A method according to claim 5 wherein collecting the pills ejected from the pill apertures further comprises collecting the pills ejected from the pill apertures, and directing the pills toward a single one of the series of containers for deposition therein, with a collection mechanism comprising a collection device disposed adjacent to the radially outward portion of the single rotary drum about the second angular position, and configured to extend across a plurality of the rows of pill apertures so as to collect the pills ejected therefrom.

7. A method according to claim 5 wherein applying a negative pressure to the plurality of pill apertures further comprises simultaneously applying a negative pressure to each of the plurality of plurality of pill apertures with the negative pressure system located at least between the first angular position and the second angular position, the negative pressure system being operably engaged with the radially inward portion of the single rotary drum and in fluid communication with each of the plurality of pill apertures located at least between the first angular position and the second angular position, *including the second angular position,* so as to retain the pills therein as the single rotary drum rotates about the first axis.

8. A method according to claim 5 wherein ejecting the pills from the pill apertures further comprises emitting positively pressurized air to the pill apertures of the single rotary drum at the second angular position, the air being emitted at a positive pressure capable of overcoming the negative pressure retaining the pills within the pill apertures, with an air emission device operably engaged with the radially inward portion of the single rotary drum and in communication with each of the plurality of rows of pill apertures, so as to eject the pills therefrom.

9. A method according to claim 8 wherein emitting positively pressurized air to the pill apertures further comprises selectively emitting positively pressurized air to the pill apertures of each of the plurality of rows, disposed at the second angular position, so as to selectively eject the respective pills from the corresponding pill apertures toward the collection mechanism.

10. A method according to claim 5 wherein ejecting the pills from the pill apertures further comprises receiving positively pressurized air within a manifold device operably engaged with the radially inward portion of the single rotary drum and in communication with each of the plurality of rows of pill apertures about the second angular position, and selectively emitting the air to the pill apertures of the single rotary drum at the second angular position, the air being emitted at a positive pressure capable of overcoming the negative pressure retaining the pills within the pill apertures, so as to selectively eject the respective pills from the corresponding pill apertures toward the collection mechanism.

11. A method according to claim 10 wherein selectively emitting the air to the pill apertures further comprising selectively actuating a valve device corresponding to each of the plurality of rows of pill apertures, the valve devices being operably engaged with the manifold device, to emit the positively pressurized air therefrom to the corresponding pill aperture so as to eject the pill therefrom.

12. A method according to claim 1 further comprising determining an amount of pills deposited into each of the series of containers from the at least one rotary slat with at least one pill-counting device operably engaged with at least one of the at least one rotary slat, the ejection mechanism, and the collection mechanism.

13. A method for depositing a predetermined amount of pills into each of a series of containers, comprising:

receiving a pill in each of a plurality of pill apertures defined by a radially outward portion of a rotary drum, about a first angular position thereof, the rotary drum being configured as a cylinder rotatable in a rotational direction about a first axis extending longitudinally therethrough between at least the first angular position and a second angular position, the second angular position being angularly spaced apart from the first angular position in the rotational direction, each pill aperture configured to receive a pill from a plurality of pills disposed adjacent to the radially outward portion of the rotary drum;

applying a negative pressure to each of the plurality of pill apertures with a negative pressure system operably engaged with the radially inward portion of the rotary drum at least between the first angular position and the second angular position, *including the second angular position,* and in fluid communication with each of the plurality of pill apertures located at least between the first angular position and the second angular position *and including the second angular position,* so as to retain the pills within the pill apertures as the rotary drum rotates about the first axis between the first angular position and the second angular position;

ejecting the pills from the pill apertures at the second angular position of the rotary drum, the pills being ejected outwardly of the radially outward portion with an ejection mechanism operably engaged with the radially inward portion of the rotary drum and configured to be in communication with the pill apertures at the second angular position; and collecting the pills ejected from the pill apertures of the rotary drum, and directing the pills toward the series of containers for deposition therein with a collection mechanism disposed adjacent to the radially outward portion of the rotary drum about the second angular position.

14. A method according to claim 13 wherein the first axis is substantially horizontally disposed, and the method further comprises moving at least one container into coincidence with the collection mechanism, with a conveyor device, such that the at least one container receives a selected amount of pills from the collection mechanism.

15. A method according to claim 13 wherein receiving a pill in each of a plurality of pill apertures defined by the rotary drum further comprises receiving a pill in each of a plurality of pill apertures defined in a plurality of rows along a radially outward portion of the rotary drum.

16. A method according to claim 15 wherein collecting the pills ejected from the pill apertures further comprises collecting the pills ejected from the pill apertures, and directing the pills toward a single one of the series of containers for deposition therein, with a collection mechanism comprising a collection device disposed adjacent to the radially outward portion of the rotary drum about the second angular position, and configured to extend across a plurality of the rows of pill apertures so as to collect the pills ejected therefrom.

17. [An apparatus] *A method* according to claim 15 wherein applying a negative pressure to the plurality of pill apertures further comprises simultaneously applying a negative pressure to each of the plurality of plurality of pill apertures with the negative pressure system located at least between the first angular position and the second angular position, *including the second angular position*, the negative pressure system being operably engaged with the radially inward portion of the rotary drum and in fluid communication with each of the plurality of pill apertures located at least between the first angular position and the second angular position[,] so as to retain the pills therein as the rotary drum rotates about the first axis.

18. A method according to claim 15 wherein ejecting the pills from the pill apertures further comprises emitting positively pressurized air to the pill apertures of the rotary drum at the second angular position, the air being emitted at a positive pressure capable of overcoming the negative pressure retaining the pills within the pill apertures, with an air emission device operably engaged with the radially inward portion of the rotary drum and in communication with each of the plurality of rows of pill apertures, so as to eject the pills therefrom.

19. A method according to claim 18 wherein emitting positively pressurized air to the pill apertures further comprises selectively emitting positively pressurized air to the pill apertures of each of the plurality of rows, disposed at the second angular position, so as to selectively eject the respective pills from the corresponding pill apertures toward the collection mechanism.

20. A method according to claim 18 wherein ejecting the pills from the pill apertures further comprises receiving positively pressurized air within a manifold device operably engaged with the radially inward portion of the rotary drum and in communication with each of the plurality of rows of pill apertures about the second angular position, and selectively emitting the air to the pill apertures of the rotary drum at the second angular position, the air being emitted at a positive pressure capable of overcoming the negative pressure retaining the pills within the pill apertures, so as to selectively eject the respective pills from the corresponding pill apertures toward the collection mechanism.

21. A method according to claim 20 wherein selectively emitting the air to the pill apertures further comprising selectively actuating a valve device corresponding to each of the plurality of rows of pill apertures, the valve devices being operably engaged with the manifold device, to emit the positively pressurized air therefrom to the corresponding pill aperture so as to eject the pill therefrom.

22. A method according to claim 13 further comprising determining an amount of pills deposited into each of the series of containers from the rotary drum with at least one pill-counting device operably engaged with at least one of the rotary drum, the ejection mechanism, and the collection mechanism.

23. An automated packaging apparatus for depositing a predetermined amount of pills into each of a series of containers, comprising:

at least one rotary slat, each rotary slat being configured as a cylinder independently rotatable in a rotational direction about a first axis extending longitudinally therethrough between at least a first angular position and a second angular position, the second angular position being angularly spaced apart from the first angular position in the rotational direction, each rotary slat comprising a radially inward portion and a radially outward portion, the radially outward portion defining a plurality of pill apertures therein, each pill aperture being adapted to receive a pill from a plurality of pills disposed adjacent to the radially outward portion of the respective cylinder, the pills being received by the pill apertures about the first angular position of the at least one rotary slat;

a negative pressure system operably engaged with the radially inward portion of the at least one rotary slat at least between the first angular position and the second angular position, *including the second angular position,* and in fluid communication with each of the plurality of pill apertures located at least between the first angular position and the second angular position, *including the second angular position*, the negative pressure system configured to apply a negative pressure to each of the plurality of pill apertures at least between the first angular position and the second angular position *and including the second angular position,* so as to retain the pills therein as the at least one rotary slat rotates about the first axis between the first angular position and the second angular position;

an ejection device operably engaged with the radially inward portion of the at least one rotary slat and configured to be in communication with the pill apertures thereof at the second angular position so as to eject the respective pills from the pill apertures outwardly of the radially outward portion; and a collection mechanism disposed adjacent to the radially outward portion of the at least one rotary slat about the second angular position, the collection mechanism being configured to collect the pills ejected from the pill apertures of the at least one rotary slat and to direct the pills toward the series of containers for deposition therein.

24. An apparatus according to claim 23 wherein the ejection device further comprises an air emission device.

25. An apparatus according to claim 24 wherein the air emission device is configured to emit positively pressurized air to the pill apertures of the at least one rotary slat disposed at the second angular position.

26. An apparatus according to claim 25 wherein the air is emitted at a positive pressure capable of overcoming the negative pressure retaining the pills within the pill apertures, so as to eject the pills therefrom.

27. An apparatus according to claim 23 wherein the first axis is substantially horizontally disposed, and the apparatus further comprises a conveying device adapted to move at least one container into coincidence with the collection mechanism such that the at least one container receives a selected amount of pills from the collection mechanism.

28. An apparatus according to claim 23 wherein the at least one rotary slat comprises a single rotary drum defining a plurality of rows of pill apertures about the radially outward portion thereof.

29. An apparatus according to claim 28 wherein the collection mechanism further comprises a collection device disposed adjacent to the radially outward portion of the single rotary drum about the second angular position, the collection device being configured to extend across a plurality of the rows of pill apertures so as to collect the pills ejected therefrom and to direct the pills toward a single one of the series of containers for deposition therein.

30. An apparatus according to claim 28 wherein the negative pressure system is operably engaged with the radially inward portion of the single rotary drum and in fluid communication with each of the plurality of pill apertures thereof such that the negative pressure system is configured to simultaneously apply a negative pressure to the plurality of pill apertures located at least between the first angular position and the second angular position so as to retain the pills therein, as the single rotary drum rotates about the first axis.

31. An apparatus according to claim 28 wherein the ejection device further comprises an air emission device operably engaged with the radially inward portion of the single rotary drum and in communication with each of the plurality of rows of pill apertures about the second angular position, the air emission device being configured to emit positively pressurized air to the pill apertures of the single rotary drum at the second angular position, the air being emitted at a positive pressure capable of overcoming the negative pressure retaining the pills within the pill apertures, so as to eject the pills therefrom.

32. An apparatus according to claim 31 wherein the air emission device is configured to selectively emit the positively pressurized air to the pill apertures of each of the plurality of rows, disposed at the second angular position, so as to selectively eject the respective pills from the corresponding pill apertures toward the collection mechanism.

33. An apparatus according to claim 28 wherein the ejection device further comprises a manifold device operably engaged with the radially inward portion of the single rotary drum and in communication with each of the plurality of rows of pill apertures about the second angular position, the manifold device being configured to receive positively pressurized air therein and to selectively emit the air to the pill apertures of the single rotary drum at the second angular position, the air being emitted at a positive pressure capable of overcoming the negative pressure retaining the pills within the pill apertures, so as to selectively eject the respective pills from the corresponding pill apertures toward the collection mechanism.

34. An apparatus according to claim 33 further comprising a valve device corresponding to each of the plurality of rows of pill apertures, the valve devices being operably engaged with the manifold device and configured to be selectively actuatable for emitting the positively pressurized air therefrom to the corresponding pill aperture so as to eject the pill therefrom.

35. An apparatus according to claim 23 further comprising at least one pill-counting device operably engaged with at least one of the at least one rotary slat, the ejection mechanism, and the collection mechanism, the at least one pill-counting device being configured to determine an amount of pills deposited into each of the series of containers from the at least one rotary slat.

36. An automated packaging apparatus for depositing a predetermined amount of pills into each of a series of containers, comprising:

a rotary drum configured as a cylinder rotatable in a rotational direction about a first axis extending longitudinally therethrough between at least a first angular position and a second angular position, the second angular position being angularly spaced apart from the first angular position in the rotational direction, the rotary drum comprising a radially inward portion and a radially outward portion, the radially outward portion defining a plurality of pill apertures therein, each pill aperture being adapted to receive a pill from a plurality of pills disposed adjacent to the radially outward portion of the rotary drum, the pills being received by the pill apertures about the first angular position of the rotary drum;

a negative pressure system operably engaged with the radially inward portion of the rotary drum at least between the first angular position and the second angular position, *including the second angular position,* and in fluid communication with each of the plurality of pill apertures located at least between the first angular position and the second angular position, *including the second angular position*, the negative pressure system being configured to apply a negative pressure to each of the plurality of pill apertures at least between the first angular position and the second angular position *and including the second angular position,* so as to retain the pills therein as the rotary drum rotates about the first axis between the first angular position and the second angular position;

an ejection device operably engaged with the radially inward portion of the rotary drum and configured to be in communication with the pill apertures thereof at the second angular position so as to eject the respective pills from the pill apertures outwardly of the radially outward portion; and a collection mechanism disposed adjacent to the radially outward portion of the rotary drum about the second angular position, the collection mechanism being configured to collect the pills ejected from the pill apertures of the rotary drum and to direct the pills toward the series of containers for deposition therein.

37. An apparatus according to claim 36 wherein the first axis is substantially horizontally disposed, and the apparatus further comprises a conveying device adapted to move at least one container into coincidence with the collection mechanism such that the at least one container receives a selected amount of pills from the collection mechanism.

38. An apparatus according to claim 36 wherein the rotary drum is configured such that the pill apertures are arranged in a plurality of rows about the radially outward portion thereof.

39. An apparatus according to claim 38 wherein the collection mechanism further comprises a collection device disposed adjacent to the radially outward portion of the rotary drum about the second angular position, the collection device being configured to extend across a plurality of the rows of pill apertures so as to collect the pills ejected therefrom and to direct the pills toward a single one of the series of containers for deposition therein.

40. An apparatus according to claim 38 wherein the negative pressure system is operably engaged with the radially inward portion of the rotary drum and in fluid communication with each of the plurality of pill apertures thereof such that the negative pressure system is configured to simultaneously apply a negative pressure to the plurality of pill apertures located at least between the first angular position and the second angular position so as to retain the pills therein, as the rotary drum rotates about the first axis.

41. An apparatus according to claim 38 wherein the ejection device further comprises an air emission device operably engaged with the radially inward portion of the rotary drum and in communication with each of the plurality of rows of pill apertures about the second angular position, the air emission device being configured to emit positively pressurized air to the pill apertures of the rotary drum at the second angular position, the air being emitted at a positive pressure capable of overcoming the negative pressure retaining the pills within the pill apertures, so as to eject the pills therefrom.

42. An apparatus according to claim 41 wherein the air emission device is configured to selectively emit the positively pressurized air to the pill apertures of each of the plurality of rows, disposed at the second angular position, so as to selectively eject the respective pills from the corresponding pill apertures toward the collection mechanism.

43. An apparatus according to claim 38 wherein the ejection device further comprises a manifold device operably engaged with the radially inward portion of the rotary drum and in communication with each of the plurality of rows of pill apertures about the second angular position, the manifold device being configured to receive positively pressurized air therein and to selectively emit the air to the pill apertures of the rotary drum at the second angular position, the air being emitted at a positive pressure capable of overcoming the negative pressure retaining the pills within the pill apertures, so as to selectively eject the respective pills from the corresponding pill apertures toward the collection mechanism.

44. An apparatus according to claim 43 further comprising a valve device corresponding to each of the plurality of rows of pill apertures, the valve devices being operably engaged with the manifold device and configured to be selectively actuatable for emitting the positively pressurized air therefrom to the corresponding pill aperture so as to eject the pill therefrom.

45. An apparatus according to claim 36 further comprising at least one pill-counting device operably engaged with at least one of the rotary drum, the ejection mechanism, and the collection mechanism, the at least one pill-counting device being configured to determine an amount of pills deposited into each of the series of containers from the rotary drum.

*46. The method of claim 1, wherein the pill apertures located at the second angular position are configured to communicate with both the negative pressure received from the negative pressure system and a positive air pressure from the ejection mechanism greater than the negative pressure, such that the pill apertures located at the second angular position are configured to eject the respective pills from the pill apertures outwardly of the radially outward portion.*

*47. The method of claim 1, wherein the negative pressure system is operably engaged with all of the plurality of pill apertures simultaneously.*

*48. The method of claim 13, wherein the pill apertures located at the second angular position are configured to communicate with both the negative pressure received from the negative pressure system and a positive air pressure from the ejection mechanism greater than the negative pressure, such that the pill apertures located at the second angular position are configured to eject the respective pills from the pill apertures outwardly of the radially outward portion.*

*49. The method of claim 13, wherein the negative pressure system is operably engaged with all of the plurality of pill apertures simultaneously.*

*50. The apparatus of claim 23, wherein the pill apertures located at the second angular position are configured to communicate with both the negative pressure received from the negative pressure system and a positive air pressure from the ejection mechanism greater than the negative pressure, such that the pill apertures located at the second angular position are configured to eject the respective pills from the pill apertures outwardly of the radially outward portion.*

*51. The apparatus of claim 23, wherein the negative pressure system is operably engaged with all of the plurality of pill apertures simultaneously.*

*52. The apparatus of claim 36, wherein the pill apertures located at the second angular position are configured to communicate with both the negative pressure received from the negative pressure system and a positive air pressure from the ejection mechanism greater than the negative pressure, such that the pill apertures located at the second angular position are configured to eject the respective pills from the pill apertures outwardly of the radially outward portion.*

*53. The apparatus of claim 36, wherein the negative pressure system is operably engaged with all of the plurality of pill apertures simultaneously.*

*54. A rotary slat for depositing one or more pills into at least one container, comprising:*

*a radially inward portion at least partially defining an interior cavity of the rotary slat;*

*a radially outward portion;*

*a plurality of pill apertures defined in the radially outward portion of the rotary slat, each pill aperture being adapted to receive a pill from a plurality of pills disposed adjacent to the radially outward portion of the rotary slat;*

*wherein the plurality of pill apertures are in communication with the radially inward portion and the interior cavity of the rotary slat;*

*wherein the rotary slat is rotatable in a rotational direction extending circumferentially along the radially outward portion between at least a first angular position and at least a second angular position, the second angular position being angularly spaced apart from the first angular position in the rotational direction,*

*wherein the interior cavity is in fluid communication with the plurality of pill apertures located at least between the first angular position and the second angular position, including the second angular position;*

*wherein the interior cavity is configured to receive a negative pressure such that the negative pressure is applied to the pill apertures located at least between the first angular position and the second angular position, including the second angular position; and*

*wherein the pill apertures located at the second angular position are configured to communicate with both the negative pressure received from the interior cavity and a positive air pressure emission greater than the negative pressure, such that the pill apertures located at the second angular position are configured to eject the respective pills from the pill apertures outwardly of the radially outward portion.*

*55. The rotary slat of claim 54, wherein the rotary slat is configured as a cylinder.*

*56. The rotary slat of claim 54, wherein the interior cavity is configured to at least partially enclose a positive air emission device.*

*57. The rotary slat of claim 54 further comprising at least one circumferential track extending in the rotational direction along the radially outward portion of the rotary slat, and wherein the at least one circumferential track is configured to engage at least one drive wheel.*

*58. The rotary slat of claim 57, wherein the at least one circumferential track defines a radially flat surface.*

*59. The rotary slat of claim 57, wherein the circumferential track is disposed adjacent the plurality of pill apertures.*

*60. The rotary slat of claim 54, wherein the rotary slat further comprises a contiguous groove in the radially outward portion extending circumferentially around the rotary slat.*

*61. The rotary slat of claim 54, wherein the radially outward portion defines a circumferential contour sloping radially inward towards the plurality of pill apertures.*

*62. The rotary slat of claim 54, wherein the rotary slat defines at least one side surface, and wherein the at least one side surface defines a frustoconical drive surface configured to engage a drive wheel.*

*63. The rotary slat of claim 54, wherein each of the plurality of pill apertures defines a first opening on the radially inward portion and a second opening on the radially outward portion, and wherein the second opening is larger than the first opening.*

*64. The rotary slat of claim 54, wherein the rotary slat is configured to engage a second rotary slat such that the rotary slat and the second rotary slat are disposed concentrically about a first axis, the first axis being perpendicular to a plane of the rotational direction.*

*65. The rotary slat of claim 64, wherein the interior cavity of the rotary slat is configured to fluidly connect to a second interior cavity of the second rotary slat.*

*66. The rotary slat of claim 54, wherein the plurality of pill apertures includes at least two rows of pill apertures defined circumferentially along the radially outward portion.*

*67. A rotary drum for depositing one or more pills into at least one container, comprising:*

*a radially inward portion at least partially defining an interior cavity of the rotary drum;*

*a radially outward portion;*

*a plurality of pill apertures defined in the radially outward portion of the rotary drum, each pill aperture being adapted to receive a pill from a plurality of pills disposed adjacent to the radially outward portion of the rotary drum;*

*wherein the plurality of pill apertures are in communication with the radially inward portion and the interior cavity of the rotary drum;*

*wherein the rotary drum is rotatable in a rotational direction extending circumferentially along the radially outward portion between at least a first angular position and at least a second angular position, the second angular position being angularly spaced apart from the first angular position in the rotational direction,*

*wherein the interior cavity is in fluid communication with the plurality of pill apertures located at least between the first angular position and the second angular position, including the second angular position;*

*wherein the interior cavity is configured to receive a negative pressure such that the negative pressure is applied to the pill apertures located at least between the first angular position and the second angular position, including the second angular position; and*

*wherein the pill apertures located at the second angular position are configured to communicate with both the negative pressure received from the interior cavity and a positive air pressure emission greater than the negative pressure, such that the pill apertures located at the second angular position are configured to eject the respective pills from the pill apertures outwardly of the radially outward portion.*

*68. The rotary drum according to claim 67 wherein the plurality of pill apertures comprises at least two rows of pill apertures defined circumferentially along the radially outward portion.*

*69. The rotary drum of claim 67, wherein the rotary drum is configured as a cylinder.*

*70. The rotary drum of claim 67, wherein the interior cavity is configured to at least partially enclose a positive air emission device.*

*71. The rotary drum of claim 67 further comprising at least one circumferential track extending in the rotational direction along the radially outward portion of the rotary drum, and wherein the at least one circumferential track is configured to engage at least one drive wheel.*

*72. The rotary drum of claim 71, wherein the at least one circumferential track defines a radially flat surface.*

*73. The rotary drum of claim 71, wherein the circumferential track is disposed adjacent the plurality of pill apertures.*

*74. The rotary drum of claim 67, wherein the rotary drum further comprises a contiguous groove in the radially outward portion extending circumferentially around the rotary drum.*

*75. The rotary drum of claim 67, wherein the radially outward portion defines a circumferential contour sloping radially inward towards the plurality of pill apertures.*

*76. The rotary drum of claim 67, wherein the rotary drum defines at least one side surface, and wherein the at least one side surface defines a frustoconical drive surface configured to engage a drive wheel.*

*77. The rotary drum of claim 67, wherein each of the plurality of pill apertures defines a first opening on the radially inward portion and a second opening on the radially outward portion, and wherein the second opening is larger than the first opening.*

*78. A method of using a rotary slat to deposit one or more pills into a container, the rotary slat comprising a radially inward portion at least partially defining an interior cavity of the rotary slat; a radially outward portion; a plurality of pill apertures defined in the radially outward portion of the rotary slat, each pill aperture being adapted to receive a pill from a plurality of pills disposed adjacent to the radially outward portion of the rotary slat; wherein the plurality of pill apertures are in communication with the radially inward portion and the interior cavity of the rotary slat; wherein the rotary slat is rotatable in a rotational direction extending circumferentially along the radially outward portion between at least a first angular position and at least a second angular position, the second angular position being angularly spaced apart from the first angular position in the rotational direction, wherein the interior cavity is in fluid communication with the plurality of pill apertures located at least between the first angular position and the second angular position, including the second angular position; the method comprising:*

*applying a negative pressure to the interior cavity such that the negative pressure is applied to the pill apertures located at least between the first angular position and the second angular position, including the second angular position; and*

*applying a positive air pressure to the pill apertures located at the second angular position, wherein the positive air pressure is greater than the negative pressure, such that the pill apertures located at the second angular position are configured to eject the respective pills from the pill apertures outwardly of the radially outward portion.*

*79. A method of using a rotary drum to deposit one or more pills into a container, the rotary drum comprising a radially inward portion at least partially defining an interior cavity of the rotary drum; a radially outward portion; a plurality of pill apertures defined in the radially outward portion of the rotary drum, each pill aperture being adapted to receive a pill from a plurality of pills disposed adjacent to the radially outward portion of the rotary drum; wherein the plurality of pill apertures are in communication with the radially inward portion and the interior cavity of the rotary drum; wherein the rotary drum is rotatable in a rotational direction extending circumferentially along the radially outward portion between at least a first angular position and at least a second angular position, the second angular position being angularly spaced apart from the first angular position in the rotational direction, wherein the interior cavity is in fluid communication with the plurality of pill apertures*

*located at least between the first angular position and the second angular position, including the second angular position; the method comprising:*

*applying a negative pressure to the interior cavity such that the negative pressure is applied to the pill apertures located at least between the first angular position and the second angular position, including the second angular position; and*

*applying a positive air pressure to the pill apertures located at the second angular position, wherein the positive air pressure is greater than the negative pressure, such that the pill apertures located at the second angular position are configured to eject the respective pills from the pill apertures outwardly of the radially outward portion.*

* * * * *